(No Model.)
H. R. TOWNE.
KNOB ATTACHMENT.
No. 253,789. Patented Feb. 14, 1882.
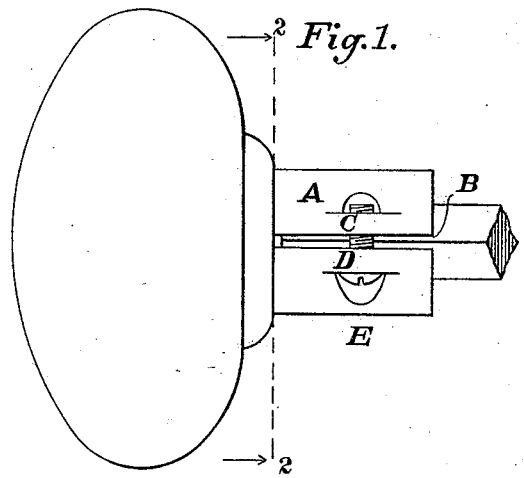
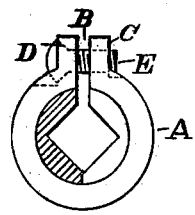
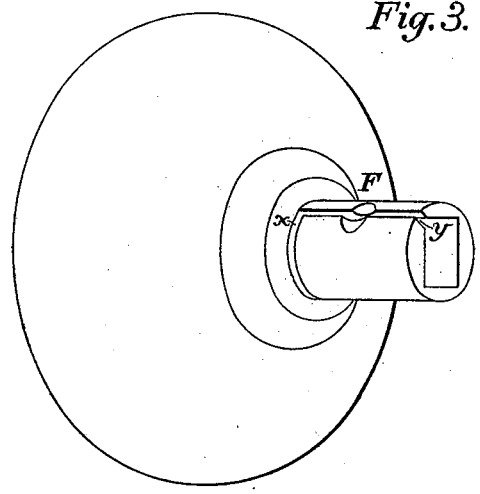
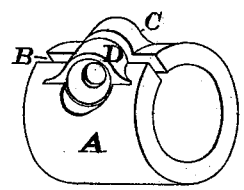
WITNESSES
Wm A. Skinkle
Chauncey N. Dutton
INVENTOR
Henry R. Towne.
By his Attorneys
Baldwin, Hopkins & Peyton

UNITED STATES PATENT OFFICE.

HENRY R. TOWNE, OF STAMFORD, CONNECTICUT, ASSIGNOR TO THE YALE LOCK MANUFACTURING COMPANY, OF SAME PLACE.

KNOB ATTACHMENT.

SPECIFICATION forming part of Letters Patent No. 253,789, dated February 14, 1882.

Application filed December 27, 1881. (No model.)

*To all whom it may concern:*

Be it known that I, HENRY R. TOWNE, of Stamford, Connecticut, have invented certain new and useful Improvements in Knob-Shank Fastenings, of which the following is a specification, reference being had to the accompanying drawings.

The object of my invention is to provide a simple, cheap, and reliable means for securing a knob-shank to a spindle, that will permit the ready adjustment of the spindle within the shank without the use of washers, to accommodate variations in the thicknesses of different doors.

My present invention is an improvement upon that for which I filed application for Letters Patent October 10, 1881, wherein I show a knob secured to a knob-shank, which latter is provided with a longitudinal slot extending from the spindle-socket out radially through the wall of the shank, and also with a transverse slot extending about half-way through the shank near its junction with the knob, which slots enable the parts of the shank to be pressed toward each other, and thus clamped firmly upon the spindle. Figure 3 illustrates such a knob-shank with its slots $x$ and $y$.

My improvement consists in providing a longitudinal slotted sleeve to surround the shank and clamp it, by means of a screw, firmly upon the shank and the shank in turn firmly upon the spindle.

In the accompanying drawings, illustrating my invention, Fig. 1 is a view of a knob and knob-shank having a surrounding sleeve, and showing a spindle in elevation. Fig. 2 is a section of a shank and sleeve on the line 2 2 of Fig. 1. Fig. 3 is a perspective view of a knob and slotted shank, and Fig. 4 is a perspective view of my shank-sleeve detached.

A indicates my knob-shank sleeve, slotted longitudinally at B, and provided with lugs C and D, adapted to receive a screw, E, and to fit over a knob-shank such as above described and cover up its slots. When this sleeve is tightened by the operation of the screw it forces together the sides of the shank and firmly holds the spindle in place. A groove, F, is made in the shank, in which the screw rests as it passes through the lugs, thus holding the sleeve more firmly onto the shank.

Having thus described my invention, what I claim, and desire to secure by Letters Patent, is—

1. The combination of the knob-shank having the slots $x$ and $y$ with the slotted sleeve A, provided with lugs C and D, in which works the screw E, substantially as herein set forth.

2. The combination of the knob-shank having the slots $x$ and $y$ and groove F with the slotted sleeve A, provided with lugs C and D, in which works the screw E, substantially as herein set forth.

In testimony whereof I have hereunto subscribed my name this 8th day of December, 1881.

HENRY R. TOWNE.

Witnesses:
  GEO. E. WHITE,
  SCHUYLER MERRITT.